United States Patent [19]

Smith

[11] Patent Number: 4,834,157
[45] Date of Patent: May 30, 1989

[54] COVER ASSEMBLY FOR EXTERIORLY MOUNTED MIRROR ON AN AUTOMOBILE OR LIKE VEHICLE

[76] Inventor: Gerard Smith, 9363 Fountainbleau Blvd., #H203, Miami, Fla. 33172

[21] Appl. No.: 217,625

[22] Filed: Jul. 11, 1988

[51] Int. Cl.⁴ .................. B65D 65/08; B60J 11/00; B60R 27/00
[52] U.S. Cl. .................................. 150/166; 280/770; 350/587
[58] Field of Search ............. 150/52 K, 52 R; 280/770; 350/582, 587, 590; 206/335

[56] References Cited

U.S. PATENT DOCUMENTS

| | | | |
|---|---|---|---|
| 663,306 | 12/1900 | Tompkins | 150/52 R |
| 775,999 | 11/1904 | Tompkins | 150/52 K |
| 777,983 | 12/1904 | Tompkins | 150/52 K |
| 1,409,666 | 3/1922 | Calise | 150/52 R |
| 1,927,913 | 9/1933 | Bennett | 150/52 K X |
| 2,048,461 | 7/1936 | Mosgoffian | 150/52 K |
| 2,243,981 | 6/1941 | Rowan | 150/52 K |
| 3,132,201 | 5/1964 | Bertell et al. | 350/587 X |

FOREIGN PATENT DOCUMENTS 55-44078  3/1980  Japan ................... 350/582

*Primary Examiner*—Sue A. Weaver
*Attorney, Agent, or Firm*—John Cyril Malloy

[57] ABSTRACT

A cover assembly designed specifically to removably cover and thereby protect the exterior exposed surface of a housing or support for an exteriorly mounted mirror on an automobile or like vehicle commonly known as rear-view mirrors or side mirrors thereby protecting the finish of the exposed surface of the mirror mount from blemishes, stains, scratches, and generally the harsh environment to which such surface is subjected during the normal travel of a vehicle without detracting from the appearance of the mirror mount or the vehicle itself.

9 Claims, 1 Drawing Sheet

COVER ASSEMBLY FOR EXTERIORLY MOUNTED MIRROR ON AN AUTOMOBILE OR LIKE VEHICLE

BACKGROUND OF THE INVENTION

1. Field of the Invention

This invention relates to ap rotective covering for a housing or support for an exteriorly mounted mirror on an automobile or like vehicle being removably attached thereto and provided to protect the exposed surfaces of the support or housing without detracting from the aesthetic appearance of the design of the automobile itself.

2. Description of the Prior Art

The use of side-view mirrors being exteriorly mounted and positioned to allow the driver or passenger to view a corresponding side and rearwardly of an automobile on which the mirrors are mounted are quite common in modern day automobile design. There is of course, an increasing demand for aesthetically pleasing automobile design as well as designs which are aerodynamically efficient. Therefore, virtually all external portions of modern day automobiles are designed and configured to meet both the standards of increased aesthetic appearance from a design stand-point and being aerodynamically efficient as set forth above. To this end, both domestic and foreign automobiles which may be considered generally in the higher price ranges includes side-view mirrors with mirror mounts or housings having an exposed leading or front surface thereof which frequently has the same "surface finish" as the remainder of the automobile itself. Frequently, these mirror mounts or housings are painted or "finished" in the same manner such as with expensive metallic paint or the like as the remainder of the automobile body "finish". Such mirror mounts or supports obviously have to protrude somewhat outwardly from the automobile in order to accomplish the feature of side and rearward viewing by the operator. This of course, positions the exposed surfaces of the mirror support in a more susceptible location for the finish on such exposed surfaces to be marred or blemished by debris, dirt, grease, insects, etc. which may physically strike or impinge against the exposed surface of such mirror mounts.

In many cases, extreme care is taken, especially with the high-priced automobiles commonly known as "exotic" automobiles such as but not limited to Mercedes, Prosche, BMW, Ferrari, Lamberguini, in order to protect the "finished" surface of portions of the automobile most susceptible to contact and therefore blemish during forward travel of the vehicle. Such is evidenced by covers for the "front end" of the automobile typically found on the Porsche sports car.

Based on the above, there is an obvious recognized need for a protective structure or assembly specifically designed to be removably attached oto the outer exposed surface portion of a support or housing for a side mirror which is exteriorly mounted and which extends outwardly from the side of the vehicle in an exposed susceptible location to contact with rode debris or the like tending to harm or damage the finish thereof.

An example of various cover assemblies known in the prior art are demonstrated in the disclosures set forth in the following United States patents. However, as set forth in greater detail hereinafter, none of such structures specifically relate to the covering of the mirror housings in the manner which would effectively overcome the above set forth problems.

Tompkins, U.S. Pat. No. 775,999 discloses an automobile headlight cover which surrounds the housing or mount of the headlight of an automobile for the protection thereof and which is removably attached thereto. Similarly, Tompkins also discloses an automobile lamp cover of somewhat different construction in his U.S. Pat. No. 777,983.

The patent to Bennett, U.S. Pat. No. 1,927,913 discloses a device for covering various manually controllable parts of a motor vehicle such as the steering wheel, gear shift lever, etc. wherein all such parts are apparently located on the vehicle interior. The structure disclosed in Bennett is particularly concerned with protection of the aforementioned parts in situations where the motor vehicle is taken to a garage or repair shop and handled by mechanics having greasy or dirty hands necessitated by the repair of the vehicle.

The patent to Mosgoffian, U.S. Pat. No. 2,048,461 discloses a protective covering closely configured to adapt in confronting relation to almost the entire exposed exterior surface of the vehicle for the protection thereof.

While the above patents are all directed towards structures intended to protect certain exterior surface finishes of an automobile, none are directed to a specific protective cover assembly specifically adapted for the protection of exterior surfaces of side mounted mirrors on an automobile wherein such a protective cover is easily attachable and detachable from its operative position relative to the mirror housing as well as being easily storable yet durable and perhaps most importantly serves the purpose of being efficiently protective while not detracting from the aesthetic appearance of the automobile or significantly from its aerodynamic efficiency.

SUMMARY OF THE INVENTION

The present invention is directed towards a protective cover assembly specifically designed to be removably attached to an exteriorly mounted side view mirror found on most modern day automobiles and extending outwardly from at least one side and generally both sides of the vehicle. The subject protective cover assembly includes a base formed of a flexible material having sufficient strength and structural characteristics to resist wear and general deterioration when exposed to the elements and/or high wind resistance conditions such as when the vehicle travels at relatively high speeds. Further, the outer surface of the protective cover is made or "finished" with an aesthetically pleasing surface configuration and/or texture which may blend in or correspond with the exterior surface of the vehicle. Such exterior surface may be formed of a vinyl material having a high-gloss or non-gloss finish. The base further is structurally configured to include a pocket dimensioned and configured to substantially conform to the outer surface configuraiton of the housing or support in which the side view mirror is mounted. The pocket of the base includes an inner surface formed of a relatively soft or specifically non-abrassive material having a "felt" like texture which may be formed from any number of natural or synthetic materials. The inner surface of the pocket of the base specifically confronts the exposed "finished" surface of the mirror housing or support and conforms to its configuration such that the protective cover, once mounted in its operative position about the exposed, exterior surface of the mirror will be both asetheticaly pleasing and provide a snug relatively tight fit about the finished surface of he mirror housing so that it will not be easily displaced or removed when exposed to high wind conditions such as when the vehicle travels at high speeds.

Further features of the base include a peripheral seam extending substantially continuously about an open face of the pocket wherein the seam may be formed from a reinforced materil or alternately, a somewhat elastic or flexible material which is dimensioned and configured to aid in the gripping or snug-fit engagement of the base abut the exposed surface of the mirror housing or support. The base and accordingly the pocket defined on the inner portions of the base, include one outer closed distal end disposed to protectively cover the outer distal end or extremity of the mirror housing. The opposite end of the mirror is open and is cooperatively disposed and structured with a connecting means used to maintain a secure connection or mounting of the protective cover about the mirror housing. The aforementioned open face of the base of course communicates directly with the interior pocket of the base and is configured and dimensioned to allow clear viewing of an operator or other occupant of the vehicle through such open face to the mirror such that the intended side and rear portion of the vehicle may be adequately monitored.

Further, the actual dimensions, configurations and to some extent certain structural features of the subject protective cover may vary depending upon the specific design, dimension and configuration of the mirror housing intended to be protected. Naturally, the mirror housings or supports on each vehicle will of course vary in accordance with the particular design of the exterior portions of the vehicle. While certain dimensions and configurations of the subject protective cover may be adaptable for use on more than one vehicle type, the structural, design modifications to accommodate the other brands of vehicles will generally be minor at best and certainly within the intended scope of protection of the subject invention.

The invention accordingly comprises the features of constructon, a combination of elements and arrangement of parts which will be exemplified in the construction hereinafter set forth and the scope of the invention will be indicated in the claims

BREIF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 4:
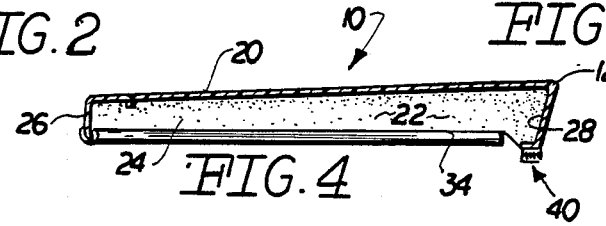
FIG. 4 is a longitudinal sectional view taken along line 4—4 of FIG. 2.
Figures 5, 6:
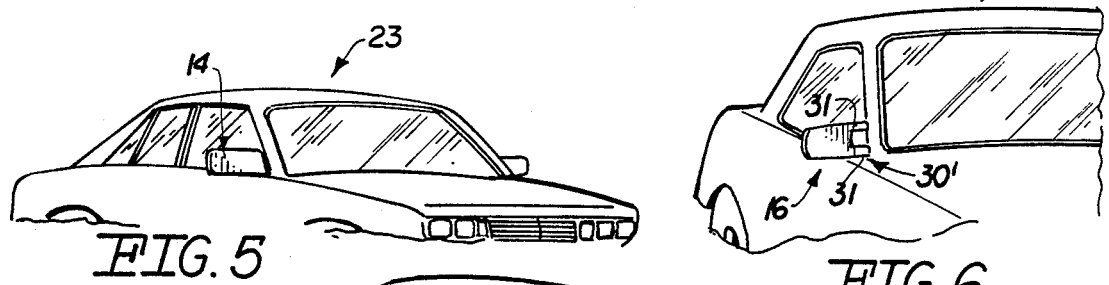
FIGS. 5, 6 and 7 are repsectively perspective views in partial cut-away of different design configurations of mirror housings or supports which differs according to the make of vehicle and design thereof on which they are mounted.
Figure 7:
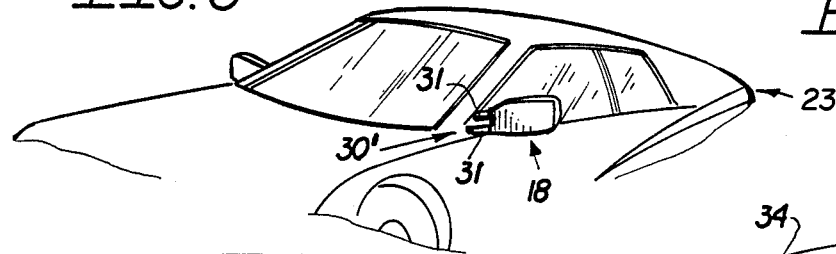

As shown primarily in FIGS. 1 through 4, the present invention is directed towards a protective cover assembly generally indicated as 10 and including a base 12 made of a materail of sufficient flexibility to be folded upon itself such as when being stored and also, to conform to the surface of a mirror support or housing of any one of a variety of design configuraitons for a mirror housing 14, 16 and 18 as represented in FIGS. 5, 6 and 7. The base 12 includes an exterior surface 20 which may have either a high gloss or low gloss finish but is sepecifically textured and configured to add to the aesthetic appearance of the given vehicle 23 on which the mirror support or housing is mounted. Further, the base 12 is formed from a liquid or moisture impermeable material in that a primary function of the subject protective covering assembly 10 is to protect the outer exposed "finished" surface of the mirror support or housing 14, 16, 18 from being blemished, marred, soiled, etc. by coming into contact with rode debris, insects or other materials which could possible harm the finish of the mirror support especially during high-speed travel of the vehicle.

The base 12 has an interior pocket as at 22 the boundaries of which are defined by an inner surface 24. The dimension and configuration of the inner pocket 22 may be effectively matched or corrspond to the exterior surface configuration of the mirror support on which it is intended to be mounted when in its protective position. Accordingly, the flexibility of the material from which the base is formed should be sufficient to allow conformance of the protective cover when the inner surface of the pocket 22 overlies and confronts the exterior "finish" surface of the mirror support being protected. Also, while the exterior surface 20 may be formed from an aesthetically pleasing material such as textured vinyl or any applicable material the inner surface 24 should have a smooth or soft, non-abrasive texture and compostion preferably common to a "felt" material and may take the form of any type of natural or synthetic material which is sufficiently non-abrasive so as to not harm the finish of the exposed surface of the mirror support or mount 14, 16, 18.

The base 12 as well as the inner pocket 22 is further structured to include a substantially closed outer or distal end 26 and an open opposite end 28. The distal end 26 is closed such that the outer extremity of the mirror housing is adequately covered in a protectve fashion. Similarly, the opposite end 28 is open so as to allow conformance of this end and especially peripheral portions thereof about any type of supporting stem or mount 30 which may generally be considered a part of the mirror housing and be dimensioned and configured to position the mirror a sufficient distance outwardly from a corresponding side of the vehicle 23 so that such mirror can be adequately viewed by the occupant or operator of the vehicle to maintain surveillance over the side and rear portions of the vehicle.

Figure 1:
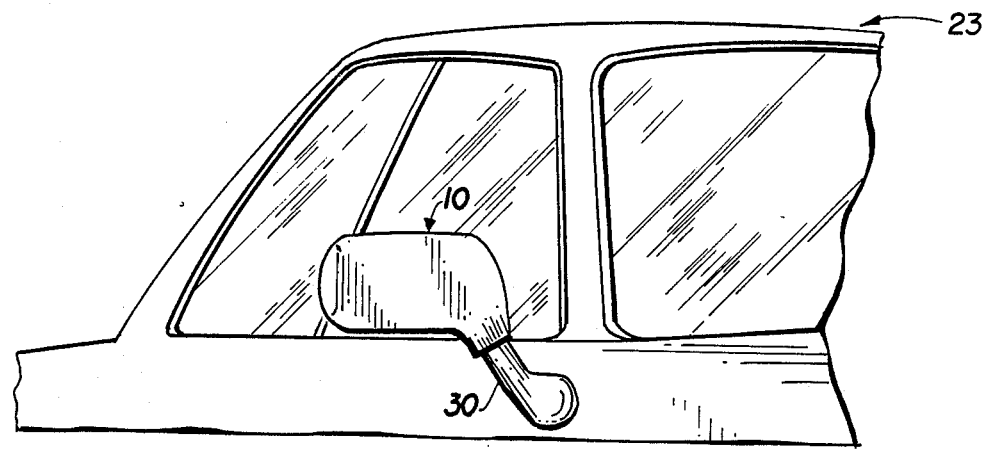
FIG. 1 is a perspective view in partial cut-away of the cover assembly of the present invention mounted on a support or housing for an exteriorly mounted side view mirror of an automobile type vehicle.
Figures 2, 3:
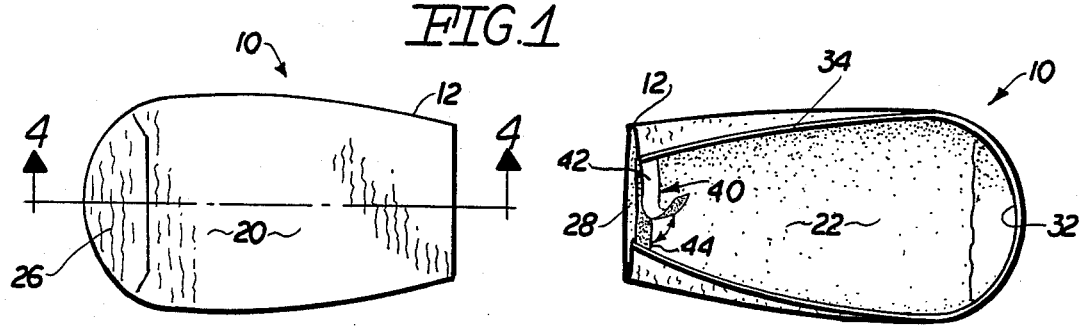
FIG. 2 is a front view of exterior surface portions of one embodiment of the present invention.
FIG. 3 is a rear view of the embodiment of FIG. 2.

In order to accomplish proper viewing of the mirror supported by the mirror housing, the pocket 22 communicates directly with an open face as best shown in FIG. 3. The open face 32 is sufficiently dimensioned to allow a clear unhampered site of the mirror even when the protective cover assembly 10 is maintained in its protective position as clearly pictured in FIG. 1.

Further, a seam structure 34 is formed substantially continuously about the periphery of the open face 32 and is structured from a higher density material in order to facilitate an effective gripping engagement of the base about the housing of the mirror to which it is attached. In an additional embodiment, the seam 34 may be formed from a somewhat elastic material to provide an additional "gripping" action on the housing or exposed surface on which it is mounted.

The protective cover assembly 10 further includes a connecting means generally indicated as 40 and comprising a strap assembly including, in the embodiment of FIGS. 1 through 4, two opposing straps 42 and 44 each having one end fixedly secured to the base 12 either adjacent the seam 34 or the periphery of the open end 28 as best shown in FIGS. 3 and 4. Each of the connctor straps 42 and 44 have a sufficient length to effectively surround the supporting stem 30 of the mirror housing and thereby secure the open end 28 in a snug, fitted but removable engagement thereabout. In order to secure the confronting surfaces of the straps 42 and 44, a connector is secured to such confronting surfaces. In a preferred embodiment, again such as shown in FIGS. 3 and 4, such connector may be in the form of a hook-and-loop type fastener commercially known and available under the trademark Velcro.

Figure 8:
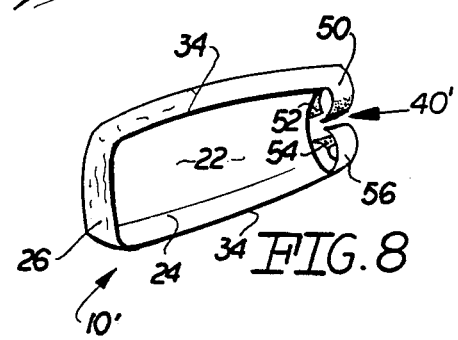
FIG. 8 is a perspective view of another embodiment of the present invention showing a modified connecting structure for attachment of the subject cover assembly to a mirror housing generally of the type shown in FIGS. 6 and 7.

With reference to FIG. 8, another embodiment of the present invention shows the connecting means 40' varying from that shown in FIGS. 3 and 4 in that the connecting means includes at least two pairs of connector straps 50, 52 and 54, 56 each disposed and configured to substantially surround and thereby be removably attached to spaced-apart arms 31 of the stem structure 30' of a mirror housing configuration as shown in the vehicle embodiments pictured in FIGS. 6 and 7. Confronting surfaces of the strap pairs 50, 52 and 54, 56 may also be removably secured to one another through the use of a hook-and-loop type fastener. However, it should be noted clearly that other types of fasteners or connectors may be utilized to insure a removable but secure fit of the cover assembly 10 or 10' about its intended mirror housing 14, 16, 18.

Now that the invention has been described, what is claimed is:

1. A cover assembly designed to cover an outer, exposed surface portion of an exteriorly mounted rearview vehicle mirror support, said assembly comprising:

a. a base formed of a flexible material having a protective outer surface and an inner surface,
   b. means including said inner surface forming a pocket on an interior of said base and being correspondingly dimensioned and configured to cover the exposed surface portion of a mirror support,
   c. said pocket comprising a closed end and an oppositely disposed open end and further including an open face of sufficient dimension to allow viewing of a mirror secured to the mirror support therethrough,
   d. an elongated seam extending along at least a majority of the periphery of said open face and dimensioned to snugly engage a portion of the mirror support surrounding the mirror,
   e. connecting means secured to said base adjacent said open end thereof and structured for connection to the mirror support and securement of said base in a covering, protective position relative to the outer exposed surface of the mirror support, and
   f. said protective position further defined by confronting engagement of said inner surface of said pocket with the outer, exposed surface of the mirror support.

2. An assembly as in claim 1 wherein said open end is disposed in continuous open communicating relation with said open face.

3. An assembly as in claim 2 wherein said connecting means comprises a connecting strap structure extending outwardly from said base substantially adjacent said open end a sufficient distance to surround and be secured to a connecting stem portion of the mirror support.

4. An assembly as in claim 3 wherein said connecting strap structure includes a connector secured thereto and being maintained thereon to attach said connecting strap structure to itself in surrounding relation to the connecting stem.

5. An assembly as in claim 4 wherein said connector comprises a hook-and-loop type fastener.

6. An assembly as in claim 1 wherin said seam is formed on a reinforced material structured to grippingly engage a surrounding portion of the mirror support.

7. An assembly as in claim 6 wherein said seam is formed of an elastic materail and being dimensioned to at least minimally expand about the surrounding portion of the mirror support.

8. An assembly as in claim 7 wherein said seam includes oppositely disposed free ends each terminating at said open end in spaced relation to one another.

9. An assembly as in claim 1 wherein said inner surface is formed of a substantially soft, non-abrasive material.

* * * * *